April 26, 1960 V. L. HANSLEY ET AL 2,934,401
PREPARATION OF SODIUM BOROHYDRIDE
Filed June 24, 1952
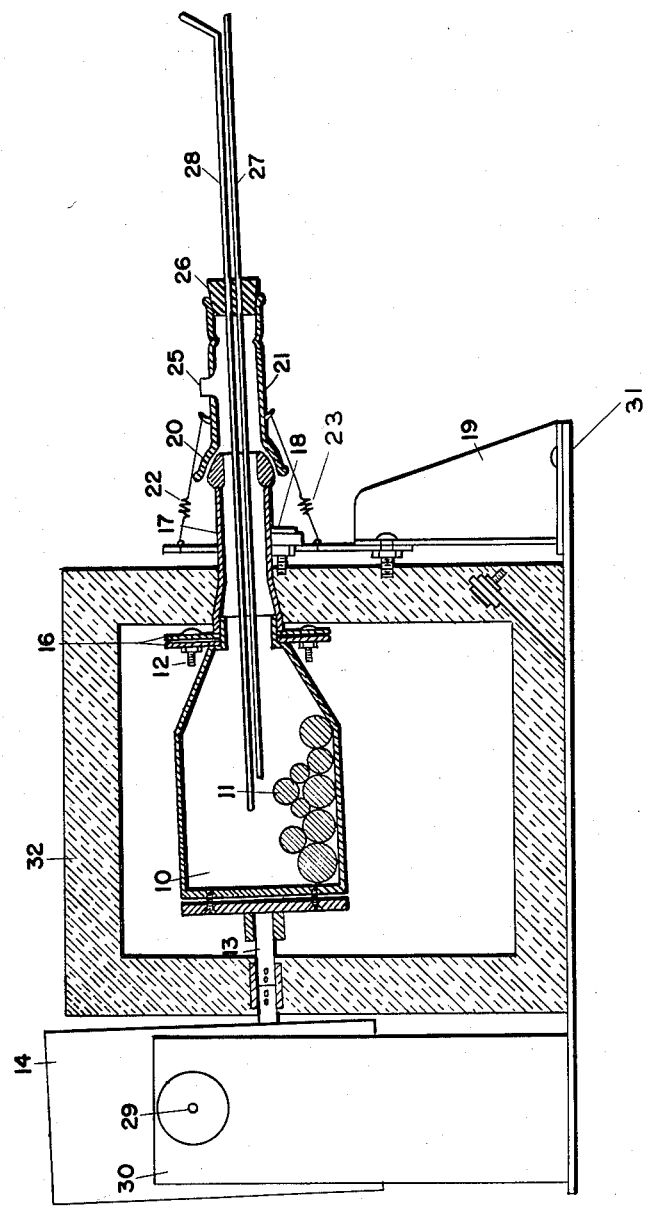
INVENTORS.
VIRGIL L. HANSLEY & EVERETT H. PRYDE
BY James H. Ryan
ATTORNEY

United States Patent Office 2,934,401
Patented Apr. 26, 1960

2,934,401

PREPARATION OF SODIUM BOROHYDRIDE

Virgil L. Hansley, Cincinnati, Ohio, and Everett H. Pryde, Kenmore, N.Y., assignors to E. I. du Pont de Nemours & Co., Wilmington, Del., a corporation of Delaware Application June 24, 1952, Serial No. 295,266

5 Claims. (Cl. 23—14)

This invention relates to the preparation of sodium borohydride.

One of the most common commercial reducing agents is sodium hydrosulfite, especially important for use with vat dyes. This material suffers from several disadvantages, including its instability in aqueous solutions and its tendency to decompose when heated, as a solid, above 60° C. Replacements for sodium hydrosulfite are consequently very desirable and may be found in the newly developed borohydrides of the alkali metals, sodium in particular. These compounds have been studied by Schlesinger and Brown with findings set forth in U.S. Patent 2,461,661 and in related disclosures. At the present time almost the only general preparations available for the borohydrides are those of Schlesinger and his co-workers.

A primary object of our invention is, therefore, provision of a method for producing an inorganic reducing agent. A further object of the invention is provision of a method for making sodium borohydride. Still further objects of the invention will be evident from the remainder of this specification and from the drawing in which:

The figure represents a view, partly in elevation and partly in section, of apparatus desirable in carrying out the invention.

We have found that our objects may be achieved by reacting, in the dry state, sodium hydride and boron trifluoride according to the equation:

$$4NaH + BF_3 \rightarrow NaBH_4 + 3NaF$$

In the preferred embodiment of the invention approximately stoichiometric quantities of gaseous boron trifluoride are passed over an agitated body of comminuted sodium hydride, the temperature of the reacting body and the speed of the reaction being carefully controlled. If proper precautions are observed temperatures within the limits 150°–400° C, may be utilized, 250°–300° C. representing the preferred range. If the temperature begins to rise too rapidly the flow of boron trifluoride may be interrupted temporarily and nitrogen or other inert gas substituted therefor.

Undesirable caking of the solid powders in the reactor is one of the deleterious effects promoted by too high a temperature. Caking may be alleviated to some extent by mixing a diluent such as inert solid powder with the finely divided hydride, the added powder perhaps operating by absorption of any liquids produced during the course of the reaction. A preferred solid diluent is a heel of material produced during a previous run of boron trifluoride over sodium hydride. When the conditions as generally outlined above are observed, a yield of up to about 51% $NaBH_4$ can be obtained within a reasonable time. The crude mixture of borohydride with other solids may be utilized directly as a reducing agent or purified as desired.

Agitation of reactants has been found of especial value to the instant process. This expedient decreases the caking of solid materials and allows the reaction to proceed further towards completion than it otherwise would. While any conventional agitation means may be employed, a ball mill has been found particularly advantageous since it simultaneously comminutes and stirs the solids. A mill convenient for the purposes of the invention is substantially that described in "Industrial and Engineering Chemistry," 43, 1759–1766 (1951), particularly at page 1764, and displayed in the figure.

In the figure a stainless steel reactor 10, containing steel balls 11, is shown supported by bolts 12 and shaft 13, the shaft being rotatably connected to air motor 14 through appropriate gearing. Careful machining at flanges 16 permits a gas tight fit to be made between reactor 10 and neck 17. Neck 17, like the reactor formed of stainless steel, is supported at roller bearing 18 by stand 19 and terminates in spherical brass joint 20. Joint 20 provides rotatable contact between glass adaptor 21 and neck 17. Tension springs 22 and 23 hold the adaptor to stand 19 with any desired resilient force. An outlet arm 25 forms an exit for gases from adaptor 21. The free end of adaptor 21 is closed by stopper 26 through which is inserted thermocouple well 27 and inlet tube 28. Air motor 14 is held at pivot 29 to stand 30 which in turn is rigidly fastened to base-plate 31 at a predetermined distance from stand 19. Furnace 32, supported on base-plate 31, is constructed around the reactor 10, holes being left to admit passage therethrough of shaft 13 and neck 17. Furnace 32 may be made of any convenient heat resistant material. If constructed of discrete units such as magnesia fire-brick, the furnace may however be easily assembled or dismantled. Heat is supplied to reactor 10 by any convenient source such as a small flame (not shown) playing into the furnace.

In practice, reactor 10 was charged with balls 11 and solid hydride and nitrogen led in through inlet tube 28 to blanket the entire system and insure exclusion of air and moisture. A rotameter (not shown) was inserted after outlet 25 to measure gas flow. After the air had been replaced by nitrogen, milling was commenced, the reactor being rotated by the motor 4, and $BF_3$ gas fed through inlet tube 28. When the absorption of $BF_3$ was considered complete the glass adaptor 21 was disconnected at joint 20, the furnace 32 disassembled and the reaction product removed from the reactor. To assist in the product removal the mill may be dropped downward by means of pivot 29.

Details of the instant process may be more easily understood from the specific examples following.

*Example 1*

A run was made by charging 1.0 mole (24 g.) of commercial quality sodium hydride into the reactor containing steel balls. The apparatus was then twice evacuated and filled with prepurified nitrogen at atmospheric pressure. After the sodium hydride had been milled for about ten minutes gaseous $BF_3$ was admitted to the system.

Over a period of about one and one-half hours 5.6 l. or 0.25 mole of boron trifluoride was conducted through the reactor, milling being continued during the entire run. The temperature was kept within the range of 30–148°. The major portion of the $BF_3$ seemed to pass through the system without reaction and to be taken up by an absorber inserted after the rotameter in the reaction train. Absorption of the gas by the NaH was evident during about two minutes of the run time only. After 1½ hours the flow of boron fluoride was discontinued and the reactor and contents cooled.

The product was transferred to a bottle in a nitrogen atmosphere, the steel balls being separated from the powdery material by passing the mixture through a screen. The product sparked and caught fire when added to water, giving an aqueous solution which readily reduced 2% permanganate solution and indigo carmine. When acidified the solution liberated a gas, probably hydrogen. It seemed probable that some sodium borohydride was present but, because of the low yield apparent from the slight absorption of $BF_3$ by the NaH, analyses were not made.

Example 2

A second run was made following essentially the procedure of Example 1 except that a temperature within the range of from about 200° C. to about 310° was maintained. Twenty-four grams of NaH of 86.4% purity were charged into the reactor and a nitrogen atmosphere supplied as before. The ball mill was started, $BF_3$ was admitted to the reactor and the run continued for about two hours. The amount of fluoride utilized was approximately theoretical, that is about 0.25 mole of $BF_3$ for each mole of NaH. Absorption of the $BF_3$ by NaH was evident for about one-half hour of the total time. After the absorption had stopped, the run was discontinued, nitrogen was passed through the system and the cooled product carefully removed and analyzed.

An Edwards analyzer, described in "The Analyst," 71 521 (1946), was utilized throughout these experiments. This intrument, standard for hydride analysis, determines the amount of hydrogen evolved by means of pressure changes. Methyl Cellosolve, 2-methoxyethanol, which reacts with sodium hydride but not with borohydride, was first added to the sample under inspection. The amount of hydrogen found was a measure of NaH present in the sample. Methyl Cellosolve acidified by small amounts of sulfuric acid was next added to the sample. The hydrogen evolved from the second Cellosolve addition was a measure of $NaBH_4$ present. The method was tested against known samples.

Product analysis of the material obtained in Example 2 showed 19% sodium hydride and 12% sodium borohy.-dride. The weight of borohydride represented a 36% yield based on the weight of sodium hydride used.

Example 3

The procedure of Example 2 was substantially repeated, the temperature however being allowed to rise to 230°–390° C. The reactor was charged with 4.35 moles of NaH and 1.52 moles of $BF_3$ passed over the agitated material. Some packing or caking of the solid reactants had been noticed during previous runs but the elevated temperature seemed to facilitate packing and to reduce yields as well. Although most of the trifluoride seemed to be absorbed, analysis showed that the product contained 12% hydride and 2.2% borohydride, both by weight. The yield was thus only 11%.

Example 4

A run was made in which a heel of previously prepared salt was utilized.

To 6.28 moles of sodium hydride were added 66.1 g. of product from a previous experiment containing about 8.9% $NaBH_4$. The solid reagents were placed in the reactor charged with steel balls and allowed to mill for about two hours. A total of 1.19 moles of $BF_3$ were conducted through the reactor over a period of about 1⅓ hours, the temperature at the thermocouple ranging from 120 to 208° C. The reactor was then cooled, charged with a second increment of 6.28 moles of NaH and allowed to grind overnight. 2.05 moles of $BF_3$ were then passed over the mixture of solids during a period of about three hours, temperature ranging from about 140° C. to 268° C. The reactor was cooled and a sample of the product taken. This sample showed a 31% conversion of NaH to $NaBH_4$. The product remaining in the reactor was treated with $BF_3$ for about 4 more hours, 1.66 additional moles of the trifluoride being employed for this purpose. The temperature during this third reaction period was held generally at 180–272° C., with one transient surge to 284° C. being noted. Analysis of the final product showed that the yield of $NaBH_4$ was 49% of the theoretical. Unreacted sodium hydride formed 14% of this product.

Example 5

An additional run was carried out in which the reactor was charged with ¾" steel balls, 234 g. of product from a previous run, analyzing 14.0% sodium hydride and 11.9% sodium borohydride, and 110 g. (4.58 gram moles) of sodium hydride. The reactor was positioned in the apparatus, the entire system evacuated and filled with nitrogen at atmospheric pressure, milling was started and heating begun. When the temperature reached 160° C. boron trifluoride gas was passed in at the rate of about 500 cc. per minute. Absorption of the trifluoride was evident but gradually decreased. After about an hour there was a sudden surge in temperature. The flow of the trifluoride was stopped momentarily and the apparatus flushed with nitrogen. Passage of the trifluoride was resumed after about ten minutes and the absorption rate remained steady at about 500 cc. per minute for another hour, the temperature throughout this second period being held in the range 230–300° C. Another temperature surge was noted but was not violent enough to demand flushing of the apparatus with nitrogen, air cooling being found sufficient. After the system had been cooled, feed of the gas was resumed. The rate of absorption then gradually decreased as the reaction neared completion. The flow of gas was discontinued after a total period of about five hours, adsorption having practically ceased. The product contained 8% sodium hydride and 10% borohydride, the latter figure representing a yield of 51%.

Several runs were made in addition to those set forth above without adding much information to that disclosed. It was found however that sodium hydride could be formed in situ. In one experiment, for example, 4 moles of sodium were milled with 11.54 moles of sodium hydride and hydrogen passed over the gently heated mixture. The sodium was rapidly converted to the hydride. Subsequent reaction of this hydride with $BF_3$ resulted in a 35% yield of $NaBH_4$, the temperature being kept in the range 130°–296° C. Other inert solids such as sodium chloride may be substituted for sodium hydride as a carrier in the initial formation of NaH, the solids serving subsequently as a diluent in the further reaction with boron trifluoride.

The best temperatures for operation of this invention are between about 150° and 400° C. Below 150° C. the reaction is too slow or does not occur at all. Around 400° C. the yield falls off. The optimum range is between about 250° and 300° C. When temperatures are carefully controlled, violent surges in particular being avoided, the reaction proceeds at a steady rate and stops eventually of its own accord. Some unreacted NaH was found in all runs although absorption of $BF_3$ has practically stopped. The total quantity of boron trifluoride absorbed was usually around 0.25 mole or less for each mole of sodium hydride utilized. Since yields of borohydride were at a maximum, about 51%, side-products were formed. Some representative figures show that a 41% borohydride yield was obtained with a $BF_3$:NaH ratio of 0.16:1, 31% at a ratio of 0.13:1 and 49% with a ratio of 0.20:1. The theoretical ratio for complete conversion is 0.25:1.

Thorough agitation of the solids aids greatly in the control of the reaction rate, the ball mill being, as noted, particularly valuable for this purpose. Milling prevents local overheating with attendant hot-spots serving as focal centers for runaway reactions. The balls themselves may act to some extent as diluents to prevent cohesion of the entire solid mass, and in addition, as heat exchange media, rapidly lowering an excess temperature found at any particular spot. Heat exchange characteristics may also explain the efficacy of steel as a constructional material for the closed reaction chamber. It may again be pointed out that while various methods of heating are suitable, as for example resistance wiring, use of a flame played into a furnace and never touching the reactor itself was found of particular value.

An inert solid diluent is preferably utilized. This diluent may consist in general of any material inert to the chemicals undergoing reaction and the products formed thereby and at the same time possessed of no harmful physical characteristics. Although NaCl was employed in some runs, a preferred diluent is a heel of products obtained from a previous reaction run. The quantity of heel employed may, like its composition, vary. For best results the heel should have a weight of about 1 to 2.5 times the weight of the solid hydride utilized. A suitable charge for the ball mill reactor is therefore 100–200 g. NaH mixed with 1.0 to 2.5 times as much heel.

The effect of the heel or other solid diluent appears to be two-fold. In the first place the sheer bulk of the inert material serves to slow down a reaction controllable at best only with difficulty. In the second place the diluent aids in preventing caking of the products, possibly by absorption of any liquid produced. If no inert material is used, a hard cement-like product usually results. Although some improvement is obtained by the use of salt, the closest approach to a free-flowing product results where, as in Example 5, a previously prepared heel is employed. Some caking occurred in the product of this example but it was by no means as marked either in extent or in intensity as that otherwise encountered. The effect of agitation or ball-milling also assists the break-up of any cake formed. The desired product is a free-flowing whitish powder.

The crude $NaBH_4$ mixed with NaF, NaH and side products, may be employed as a reducing agent directly or it may be concentrated and purified. A product holding 10–14% borohydride was treated with isopropyl amine in a Soxhlet extractor to give a material containing 51% borohydride. The amine was evaporated and the borohydride dissolved in absolute ethyl alcohol. Subsequent precipitation with petroleum ether gave as a final product sodium borohydride of 90% purity. Purification may be repeated at discretion.

In the illustrative examples nitrogen is the inert atmosphere employed to protect the reactive hydrides from moisture and air. Nitrogen injections were also utilized to hold the reaction exotherm in check when it became too violent. Other inert gases may be substituted for nitrogen, helium, neon and argon being examples commercially available. Hydrogen may also be employed as a blanket or coolant gas but its own reactivity towards oxygen renders essential greater care than is otherwise necessary. Either hydrogen or the inert gases may be admixed directly with the reactant boron trifluoride to serve as a diluent thereto.

Having now described our invention, we claim:

1. The method of forming sodium borohydride which comprises reacting solid sodium hydride with gaseous boron trifluoride in the ratio of four moles of the hydride to one mole of the trifluoride by simultaneously comminuting and agitating the hydride in the presence of gaseous boron trifluoride but in the substantial absence of moisture, air and liquid solvents while maintaining the temperature of said hydride and trifluoride between a minimum of about 150° and a maximum of 400° C.

2. The method of claim 1 in which the sodium hydride is admixed with a substantial proportion of an inert solid diluent.

3. The process which comprises reactively passing gaseous boron trifluoride over simultaneously comminuted and agitated sodium hydride maintained at a temperature between a minimum of about 150° and a maximum of 400° C. in the presence of a comminuted diluting solid but in the substantial absence of moisture, air and liquid solvents, thereby forming sodium borohydride and sodium fluoride, and subsequently separating the borohydride from the fluoride.

4. The process of claim 3 in which the temperature is maintained at about 250°–300° C.

5. The method of claim 1 in which the sodium hydride is simultaneously comminuted and agitated by heat-conductive grinding means.

References Cited in the file of this patent

UNITED STATES PATENTS

| | | |
|---|---|---|
| 2,532,217 | Winternitz | Nov. 28, 1950 |
| 2,534,533 | Schlesinger | Dec. 19, 1950 |
| 2,553,198 | Lesesne | May 15, 1951 |

OTHER REFERENCES

Goubeau et al.: "Zeitschrift für anorganische und allgemeine Chemie," vol. 263, pp. 69–81, August 1950.

Final Report, Navy Contract $NO_2(s)$ 9973, Bureau of Aeronautics, "The preparation of Pentaborane and the Evaluation of the Hazards of Handling Diborane and Pentaborane," prepared by Mine Safety Appliances Co., printed Dec. 1, 1950, p. 13.